May 23, 1933.    M. P. SCHMIDT ET AL    1,910,502
METHOD OF PRODUCING FILMS
Filed Feb. 25, 1932
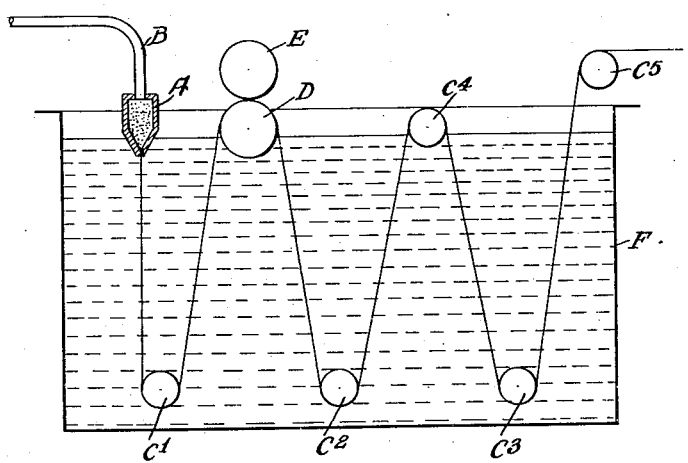
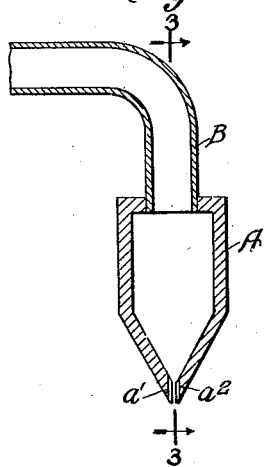 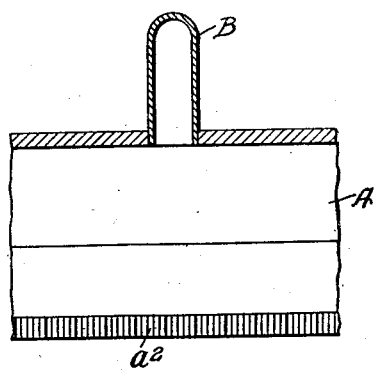

Patented May 23, 1933

1,910,502

UNITED STATES PATENT OFFICE

MAXIMILIAN PAUL SCHMIDT AND JULIUS VOSS, OF WIESBADEN-BIEBRICH, GERMANY, ASSIGNORS TO DU PONT CELLOPHANE COMPANY, INC., OF NEW YORK, N. Y., A CORPORATION OF DELAWARE

METHOD OF PRODUCING FILMS

Application filed February 25, 1932, Serial No. 595,026, and in Germany July 7, 1930.

This invention relates to sheets or films of regenerated cellulose having a pattern embossed or impressed therein, and more particularly to a process of producing the same.

Prior to this invention, sheets or films of regenerated cellulose were embossed by passing a purified dried film through an embossing calender at a high temperature. The embossing resulting from such a procedure was not stable toward the action of moisture. As a consequence, many methods have been proposed to overcome this serious defect. One procedure contemplated flowing a cellulosic solution on to a roller provided with the desired pattern and, after removing the excess solution, permitting the same to harden on the roller. Subsequently, the film was removed from the roller. In another process, it was proposed to cast the cellulosic solution on a smooth roller and then subject the film while on said roller to the action of a second roller provided with the desired pattern, the latter roller being simultaneously rinsed with a coagulating agent.

In the processes briefly described immediately above, since the pattern was produced by casting on rollers, it was possible to harden the film by coagulation on one side only. This rendered the speed of operation, and therefore the entire method, slow.

Another serious defect of the prior art procedures above mentioned was that, if the film on the roller was incompletely coagulated at one or more points, upon removal of the film the incompletely coagulated film adhered and usually remained in the depressions of the embossing roller, with the result that irregularities in the pattern were produced in the material subsequently cast.

We have found that we can produce sheets or films of regenerated cellulose with patterns impressed or embossed therein and which are stable with respect to moisture, and overcome the above-mentioned defects by extruding a cellulosic solution from a hopper having a slit into a coagulating bath and embossing the sheet or film while in the plastic state and preferably prior to the complete coagulation thereof, or by extruding a cellulosic solution into a coagulating bath through a hopper having lips formed in accordance with the pattern desired.

It is, therefore, an object of this invention to provide a method of preparing sheets or films of regenerated cellulose having a pattern impressed therein which is substantially resistant to moisture by extruding a cellulosic solution from a hopper having a slit into a coagulating bath and embossing the sheet or film while in a plastic state, and preferably prior to the complete coagulation thereof.

Another object of this invention is to provide a method of producing sheets or films of regenerated cellulose having an embossed design which is substantially resistant to moisture, which comprises extruding the cellulosic solution into a coagulating bath through a hopper having lips formed in accordance with the desired design.

Other objects will appear from the following description, appended claims and accompanying drawing forming a part of this specification and in which:

Figure 1 is a schematic side elevation, partly in section, illustrating an apparatus whereby the principles of the instant invention may be carried out;

Figure 2 is a sectional view of a hopper having lips formed in accordance with the pattern desired to be produced on the product; and Figure 3 is a section taken on lines 3—3 of Figure 2.

In accordance with the principles of the instant invention, a cellulosic solution is extruded from a hopper into a coagulating bath whereby the film may be simultaneously coagulated on both sides and the design or pattern impressed in the film in an operation combined with the production of the film. In one embodiment of the invention, the film is embossed while it is in the plastic state and preferably prior to the complete coagulation thereof. Another form of the invention contemplates forming the pattern while the cellulosic solution is being extruded.

It is to be noted that in the instant invention the film is extruded from a hopper into a coagulating bath, whereby the coagulating bath may exert its function simultaneously on both sides of the film, whereby the film will be expeditiously coagulated throughout its mass.

Referring now to the drawing wherein like reference characters designate like parts, the reference character A designates a hopper, to which the cellulosic solution is applied from some convenient and suitable source of supply through the conduit B, and from which the cellulose solution is extruded into the coagulating bath F.

Referring now to Figure 1, the hopper is of the type usually employed in the production of sheets or films of regenerated cellulose and is provided with lips which are smooth and straight. When this type of hopper is utilized, the cellulosic solution is extruded directly into the coagulating bath F and passed therethrough, the rollers $C'$, $C^2$, $C^3$ and $C^4$ serving to guide the film therethrough. After traveling through the coagulating bath, the film is then conveyed over the guide roller $C^5$ and thence subjected to the usual succeeding operations.

In accordance with the principles of the instant invention, the film, while in the plastic state, is subjected to an embossing operation, such as by being passed between the embossing rollers D and E. Though the embossing rollers D and E are shown in Figure 1 as being disposed at the top of the bath and between the guide rollers $C'$ and $C^2$, it is to be understood that the invention is not restricted to this precise location of the embossing calender. The embossing calender may be positioned at any point in the path of travel of the film so long as it acts on the film while it is in the plastic state. Preferably, the embossing rollers D and E are disposed at such a point that they operate on the film before the latter has been completely coagulated.

The coagulating bath may be of any of the usual types employed in the manufacture of sheets or films of regenerated cellulose. We prefer, however, to use a weak acid ammonium sulphate bath, because in such a type of bath the film is quite plastic, especially when it has not been completely coagulated. Consequently, the pattern may be quickly and easily embossed into the film.

It is to be noted that, when the film is subsequently hardened, regenerated, purified and dried, the pattern is not obliterated or eliminated. The pattern in the finished dried film is substantially permanent and is not substantially affected by moisture.

In another modification of the instant invention, similar results as above explained may be secured without the aid of embossing rollers D and E. This is secured by employing a hopper A having lips $a^1$ and $a^2$ provided with a pattern in accordance with that desired in the final product. To perform or carry out this method, a set-up similar to that illustrated in Figure 1 may be utilized, except that in place of the embossing rollers D and E a guide roller similar to $C^4$ may be substituted. In accordance with this procedure, the cellulosic solution is extruded from the hopper A into the coagulating bath F. By virtue of the pattern on the lips $a^1$ and $a^2$, the film is formed with the pattern while it is being extruded from the hopper and in this form coagulated during its travel through the bath F.

For illustrative purposes, the lips $a^1$ and $a^2$ are shown in the drawing as being formed with a plurality of equi-distant depressions and ridges. It is, of course, apparent that the hopper lips $a^1$ and $a^2$ may be provided with any desired pattern.

In the embodiments of the invention previously described, the film, after passing from the coagulating bath, is introduced into a regenerating bath, such as one containing sulphuric acid. It is, however, within the purview of this invention to utilize a bath which exerts both a coagulating and regenerating function.

Though the invention has been described specifically in connection with the production of sheets or films of regenerated cellulose, it is not restricted thereto. The principles of the invention are equally applicable to any process for making sheets or films wherein the compositions are subjected to coagulating baths.

Since it is obvious that various changes and modifications may be made in the above description without departing from the nature and spirit thereof, this invention is not restricted thereto except as set forth in the appended claim.

I claim:

In a method of producing regenerated cellulose sheets or films having patterns impressed therein, the steps which comprise extruding a viscose solution from a hopper having a slit into a coagulating bath whereby the film may be simultaneously coagulated on both sides thereof, and impressing the pattern in the sheet or film while it is in a partially coagulated and plastic stage and then completing the coagulation thereof.

In testimony whereof, we affix our signatures.

MAXIMILIAN PAUL SCHMIDT.
JULIUS VOSS.